US010051276B2

United States Patent
Ino

(10) Patent No.: US 10,051,276 B2
(45) Date of Patent: Aug. 14, 2018

(54) IMAGE ENCODING APPARATUS, METHOD AND IMAGING APPARATUS

(71) Applicant: CANON KABUSHIKI KAISHA, Tokyo (JP)

(72) Inventor: Kazuya Ino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/423,679

(22) Filed: Feb. 3, 2017

(65) Prior Publication Data

US 2017/0230674 A1 Aug. 10, 2017

(30) Foreign Application Priority Data

Feb. 8, 2016 (JP) ................. 2016-022216

(51) Int. Cl.

| G06K 9/36 | (2006.01) |
|---|---|
| H04N 19/186 | (2014.01) |
| H04N 19/136 | (2014.01) |
| H04N 19/167 | (2014.01) |
| H04N 19/182 | (2014.01) |
| H04N 19/44 | (2014.01) |
| H04N 19/593 | (2014.01) |
| H04N 5/378 | (2011.01) |

(52) U.S. Cl.
CPC .......... *H04N 19/186* (2014.11); *H04N 5/378* (2013.01); *H04N 19/136* (2014.11); *H04N 19/167* (2014.11); *H04N 19/182* (2014.11); *H04N 19/44* (2014.11); *H04N 19/593* (2014.11)

(58) Field of Classification Search
CPC .. H04N 19/136; H04N 19/167; H04N 19/182; H04N 19/186; H04N 19/44; H04N 19/593; H04N 19/88; H04N 5/378
See application file for complete search history.

(56) References Cited

U.S. PATENT DOCUMENTS

| 8,446,958 B2* | 5/2013 | Kashiwagi ........... H04N 19/597 375/240.16 |
|---|---|---|
| 9,521,384 B2* | 12/2016 | Jannard .................... H04N 9/64 |
| 9,716,866 B2* | 7/2017 | Jannard .................... H04N 9/04 |
| 2003/0169831 A1* | 9/2003 | Neugebauer ........... G09G 5/006 375/316 |

(Continued)

FOREIGN PATENT DOCUMENTS

| JP | 2010-004514 A | 1/2010 |
|---|---|---|
| JP | 2010-004515 A | 1/2010 |

*Primary Examiner* — Mekonen Bekele
(74) *Attorney, Agent, or Firm* — Cowan, Liebowitz & Latman, P.C.

(57) ABSTRACT

The present invention can generate lines whose spatial correlation is high from a Bayer array imaging element, and can raise the coding efficiency of a captured image thereby. A read out controller reads two lines of pixel data from the Bayer array imaging element, generates two new lines by sorting, in accordance with a rule set in advance, pixel data included in the two lines that are read out, and outputs the result; a first encoder that inputs and encodes one of the two new lines obtained by the read out controller; and a second encoder that inputs and encodes the other of the two new lines obtained by the read out controller. Then, the read out controller generates a line configured by pixels of a single color component as at least one of the two new lines.

9 Claims, 8 Drawing Sheets

(56) References Cited

U.S. PATENT DOCUMENTS

| | | | |
|---|---|---|---|
| 2011/0026820 A1* | 2/2011 | Strom | G06T 9/00 382/166 |
| 2011/0150330 A1* | 6/2011 | Jannard | H04N 19/46 382/166 |
| 2011/0298891 A1* | 12/2011 | Zhang | G01B 11/2509 348/43 |
| 2013/0011059 A1* | 1/2013 | Strom | G06T 9/00 382/166 |
| 2013/0208016 A1* | 8/2013 | Park | G09G 3/2096 345/690 |
| 2014/0307131 A1* | 10/2014 | Tanaka | H04N 9/07 348/273 |
| 2014/0363082 A1* | 12/2014 | Dixon | G06K 9/00402 382/187 |
| 2015/0103210 A1* | 4/2015 | Inoue | G02B 7/346 348/239 |
| 2015/0146978 A1* | 5/2015 | Kato | H04N 19/186 382/166 |
| 2018/0070061 A1* | 3/2018 | Jannard | H04N 9/04 |

* cited by examiner

IMAGE ENCODING APPARATUS, METHOD AND IMAGING APPARATUS

BACKGROUND OF THE INVENTION

Field of the Invention

The present invention relates to an image encoding apparatus, a method, and an imaging apparatus.

Description of the Related Art

In recent years, increases in the number of pixels and framerates have been seen in imaging apparatuses equipped with an imaging element such as a CMOS image sensor. In conjunction with this, amounts of image signal outputted per unit time from the imaging element have increased, and there is a demand for measures for expanding transmission path bandwidth for outputting an image signal and for reducing image signal transmission amounts without reducing the number of pixels.

Meanwhile, as a method of reducing image signal transmission amounts, a method in which the image signal is encoded and then compression processing is performed is known. For example, in Japanese Patent Laid-Open No. 2010-4514, a method in which compression processing is performed by a DPCM (Differential Pulse Code Modulation) encoding method is proposed. Regarding the DPCM encoding method, it is a method for performing compression by taking pixel differentials that takes advantage of the level of spatial correlation of an image, and it can be configured by a relatively simple circuit.

As a method of reading from an image capturing element in an imaging apparatus, there is a technique of simultaneously reading a pixel signal of a plurality of lines from a pixel array in which a plurality of pixels is arranged two-dimensionally. However, in the conventional technique, even in the reading out of a plurality of lines, encoding processing is simply performed in relation to each line as a one-dimensional array. It can be said that coding efficiency is impaired because the level of spatial correlation is not considered optimally in relation to a multiple line read out.

SUMMARY OF THE INVENTION

According to an aspect of the invention, there is provided an image encoding apparatus, comprising: a generator which generates two new lines of pixel data, by sorting, in accordance with a rule set in advance, two lines of pixel data which are obtained from a pixel portion in which a plurality of pixels that output signals of each color component are arranged in a Bayer array; a first encoder which encodes pixel data of one of the two new lines generated by the generator; and a second encoder which encodes pixel data of the other of the two new lines generated by the generator; wherein the generator generates pixel data of a line configured by pixels of a single color component as pixel data of at least one of the two new lines.

By virtue of the present invention, it is possible to improve coding efficiency of image data obtained from pixels of a Bayer array.

Further features of the present invention will become apparent from the following description of exemplary embodiments (with reference to the attached drawings).

DESCRIPTION OF THE EMBODIMENTS

Suitable embodiments of the present invention will be described hereinafter, with reference to the drawings.

First Embodiment

Figure 1:
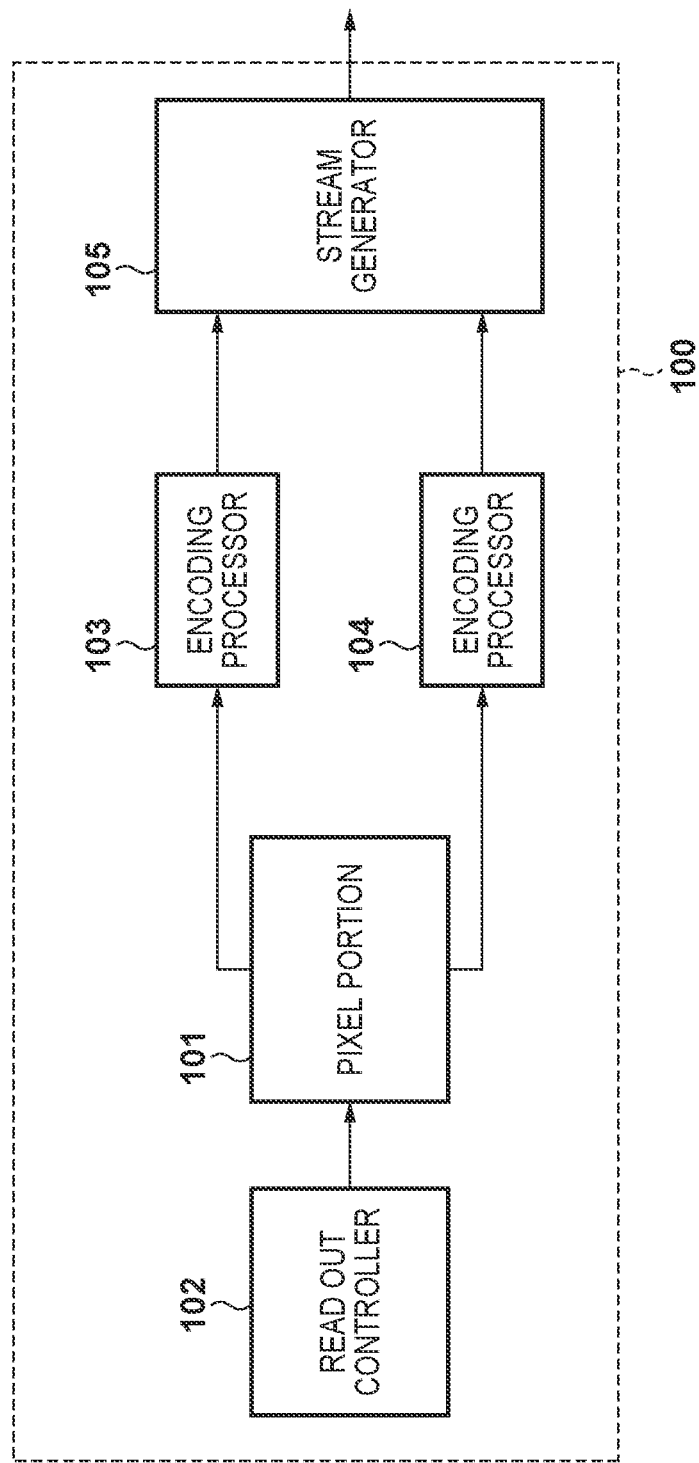
FIG. 1 is a block configuration diagram of an image capturing element in a first embodiment.

FIG. 1 is a block configuration diagram of principal portions for image encoding processing in an image sensor 100 in a first embodiment. The image sensor 100 of the present embodiment includes a pixel portion 101 where a plurality of pixels is arranged as a two-dimensional array, and a read out controller 102 which selects and reads a multiple line pixel signal from the pixel portion 101. Also, the image sensor 100 of the present embodiment includes encoding processors 103 and 104 that encode digitized pixel data read from the pixel portion 101 for each pixel block configured by a plurality of pixels to generate encoded data, and also a stream generator 105. The stream generator 105 generates a header including information needed in decoding, and adds encoded data from the encoding processors 103 and 104 after the generated header, to generate a code stream (encoded stream), which it outputs from the image sensor 100. The image sensor 100 in the embodiment is something that encodes Bayer array image data (RAW image data).

Figure 2:
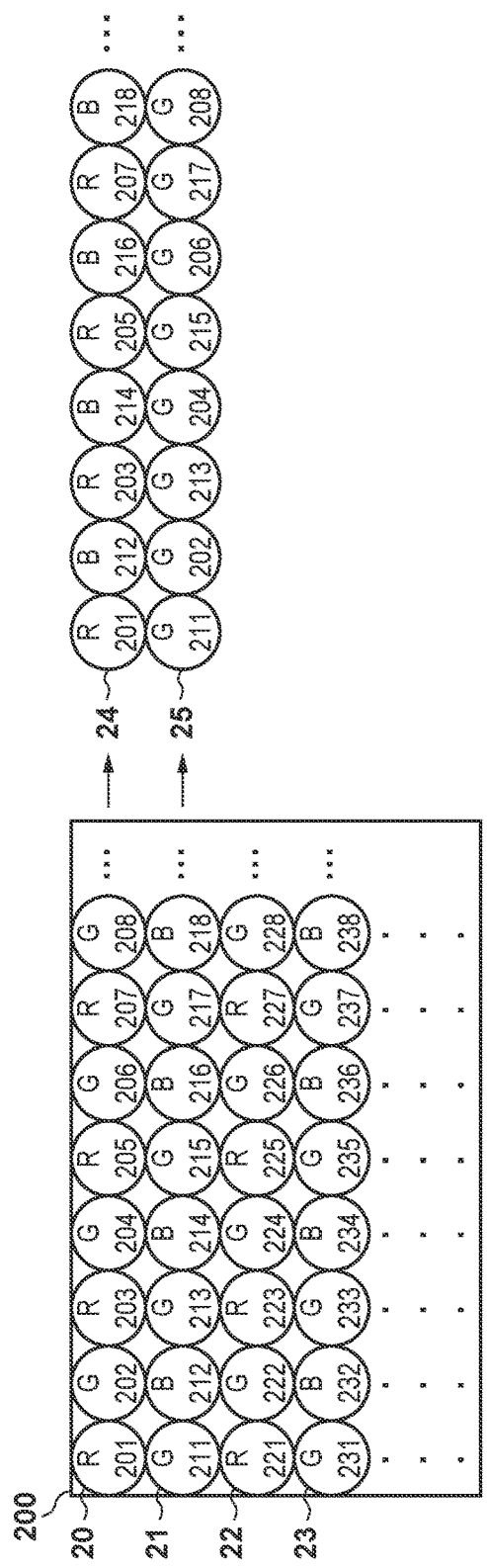
FIG. 2 is an explanatory view of control for reading from a pixel portion in the first embodiment.

Next, explanation is given using FIG. 2 for reading out of a multiple line pixel signal of the pixel portion 101 by the read out controller 102.

The reference numeral 200 in FIG. 2 illustrates a two dimensional pixel arrangement in the pixel portion 101. The pixel portion 101 is configured by pixels of each of R, G, and B color components in the Bayer array as shown graphically. In a pixel array 200, reference numerals 20, 21, 22, and 23 indicate lines. Pixels 201, 202, . . . , 208 . . . are a pixel group configuring the line 20. Pixels 211, 212, . . . , 218 . . . are a pixel group configuring the line 21. Pixels 221, 222, . . . , 228 . . . are a pixel group configuring the line 22. Pixels 231, 232, . . . , 238 . . . are a pixel group configuring the line 23.

In the Bayer array, when focusing on 2×2 pixels, there are therein one pixel of the R and the B components respectively and 2 pixels of the G component, and pixels of the G component are arranged at diagonally opposing positions. Also, this 2×2 pixel pattern is arranged repeatedly. Therefore, when focusing on a particular line, the line is either an RG line including only pixels of the R and the G components or a BG line including only pixels of the B and the G components. Moreover, RG and BG lines are repeated alternately in a vertical direction.

The read out controller 102 of the present embodiment uses the above described characteristics, and reads out the data of the pixel groups of two adjacent lines from the pixel portion 101 simultaneously, and supplies the data to the encoding processors 103 and 104 as the image data to be encoded. However, the read out controller 102 interchanges, in accordance with a rule that is set in advance, data of the pixel groups of the two lines that are read out, generates two new lines of pixel data, and supplies the pixel group data of each line that is generated to the encoding processors 103 and 104 respectively. Hereinafter, a concrete example is explained.

The coordinates of the upper left corner in the pixel portion 101 are defined as the origin point (0, 0), the horizontally rightward direction in FIG. 2 is defined as the x-axis, the straight down direction is defined as the y-axis, and a pixel value of the coordinates (i, j) is expressed as P(i, j).

Therefore the pixel groups of the j-th line and the neighboring j+1-th line can be defined as follows.

The $j$-th line=$\{P(0,j), P(1,j), P(2,j), \ldots\}$

The $j+1$-th line=$\{P(0,j+1), P(1,j+1), P(2,j+1), \ldots\}$

The read out controller 102 of the embodiment generates two new lines by performing a process to interchange the data of the pixel P(i, j) and P(i, j+1) in a case where x-coordinate i in the 2 lines to be read out is the same and i is odd. The pixels configuring these two new lines are as follows.

The new $j$-th line=$\{P(0,j), P(1,j+1), P(2,j), \ldots\}$

The new $j+1$-th line=$\{P(0,j+1), P(1,j), P(2,j+1), \ldots\}$

For example, two new lines generated in a case in which the read out controller 102 reads out the data of the pixel groups of the lines 20 and 21 in FIG. 2 from the pixel portion 101 results in the reference numerals 24 and 25 as shown graphically. As shown graphically, line 24 is the pixels 201, 212, 203, 214 . . . and pixel data of 2 components of R and B is arranged alternately. The other line 25 can be made to be the pixels 211, 202, 213, 204 . . . and pixel data that is of only the G component and in which pixel intervals are small is arranged, and it becomes possible to improve spatial correlation.

Note, in the above, the read out controller 102 is configured to, in the pixel groups in the 2 lines whose data is read out, interchange the data of the pixels P(i, j) and P(i, j+1) if the x-coordinate j is odd, but the interchange condition may be the case where the x-coordinate j is even. In such a case, the relation between lines 24 and 25 is simply the inverse.

Figure 6:
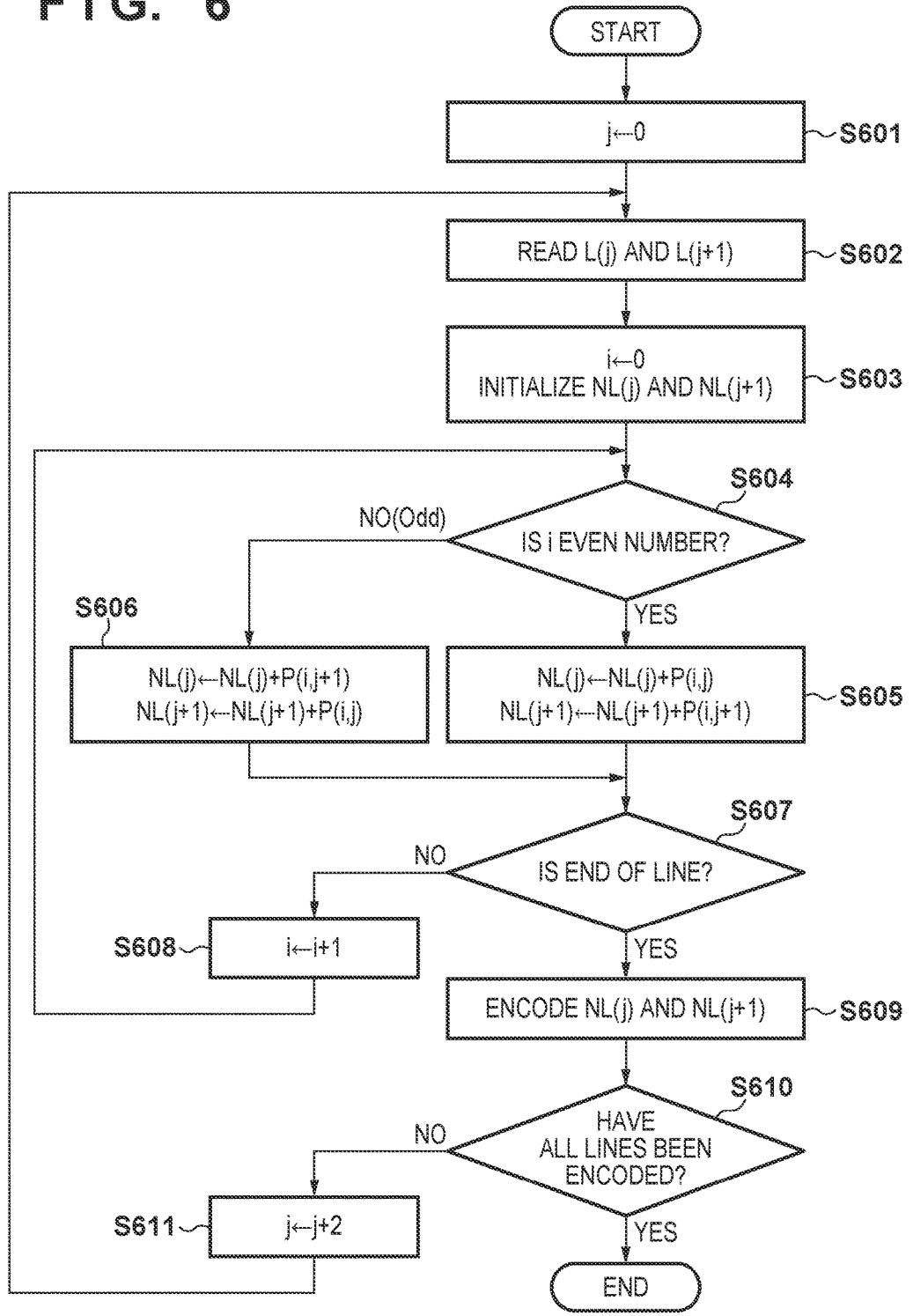
FIG. 6 is a flowchart for describing a processing procedure of a read out controller in the first embodiment.

Here, processing of the read out controller 102 in the embodiment is described in accordance with a flowchart in FIG. 6. Note, explanation is given assuming that a memory that is capable of storing the pixels of the two new lines which are to be supplied to the encoding processors 103 and 104 from the pixels of the 2 lines that are read out from the pixel portion 101 is arranged in the read out controller 102. Also, it is assumed that various variables described hereinafter are also allocated in an internal memory.

The read out controller 102 initializes a variable j for specifying the line of the pixel portion 101 (the coordinate of the y-axis) to zero in step S601. Then, the read out controller 102, from the pixel portion 101, reads out the j-th line and the subsequent j+1-th line in step S602. Hereinafter, the j-th line is denoted L(j). Also, the j+1-th line is denoted L(j+1).

Next, the read out controller 102 initializes a variable i for specifying the position (the coordinate of the x-axis) of the horizontal direction (the line direction) in the pixel portion 101 to zero in step S603. Also, the read out controller 102 initializes new lines NL(j) and NL(j+1) allocated in the internal memory to supply the encoding processors 103 and 104. When initializing, data of pixels is set to a state in which there is nothing in the new lines NL(j) and NL(j+1).

The read out controller 102 determines whether or not the variable i is an even number in step S604. If the variable i is an even number, the read out controller 102 advances the processing to step S605, and if the variable i is an odd number, the processing is advanced to step S606.

In step S605, the read out controller 102 adds to NL(j) the data of the i-th pixel P(i, j) in the line L(j) that is read out. Also, the read out controller 102 adds to NL(j+1) the data of the i-th pixel P(i, j+1) in the line L(j+1) that is read out.

In step S606, the read out controller 102 adds to NL(j+1) the data of the i-th pixel P(i, j) in the line L(j) that is read out. Also, the read out controller 102 adds to NL(j) the data of the i-th pixel P(i, j+1) in the line L(j+1) that is read out.

In step S607, the read out controller 102 determines whether or not the variable i indicates the rightmost position in the line. If not, the read out controller 102 advances the processing to step S608, causes the variable i to increase by one, and returns the processing to step S604.

On the other hand, in step S607, if the read out controller 102 determined that the variable i indicates the rightmost position in the line, the processing to generate the data of the two new lines from the pixel groups of the two lines whose the data is read out from the pixel portion 101 is completed. Thus, the read out controller 102 supplies the data of the pixel group of the new line NL(j) to the encoding processor 103, and supplies the data of the pixel group of the new line NL(j+1) to the encoding processor 104 in step S609. The encoding processors 103 and 104 perform encoding processing on the data of the provided pixel groups.

In step S610, the read out controller 102 determines whether or not the encoding processing of all lines in the pixel portion 101 is completed. If not, in step S611, the read out controller 102 causes the variable j to increase by two, and returns the processing to step S602. On the other hand, in step S610, if the read out controller 102 determines that the encoding processing of the data of all lines in the pixel portion 101 is completed, this processing terminates.

The above is a specific processing procedure of the read out controller 102 in the embodiment. As can be understood from the above description, for the read out controller 102, a processor such as a CPU can perform execution in accordance with a computer program.

Note, if the read out controller 102 can read out pixel pairs P(i, j) and P(i, j+1) of two lines from the pixel portion 101 simultaneously, it can realize the above processing without the need for 2 line's worth of memory in the read out controller 102. Accordingly, a 1 bit counter to specify whether the x-coordinate i is even-numbered or odd-numbered is arranged in the read out controller 102. Then, if this 1 bit counter indicates an even number, the read out controller 102 outputs the pixel P(i, j) to the encoding processor 103, and outputs the pixel P(i, j+1) to the encoding processor 104. On the other hand, if the 1 bit counter indicates an odd number, the read out controller 102 switches the pixel P(i, j) with the pixel P(i, j+1). Then, the read out controller 102 outputs the pixel P(i, j) to the encoding processor 104, and outputs the pixel P(i, j+1) to the encoding processor 103.

The encoding processor 103 encodes the data of the pixel group in the new line NL(j), and the encoding processor 104 encodes the data of the pixel group in the new line NL(j+1). Hereinafter, the processing content of the encoding processors 103 and 104 is described.

Figure 3:
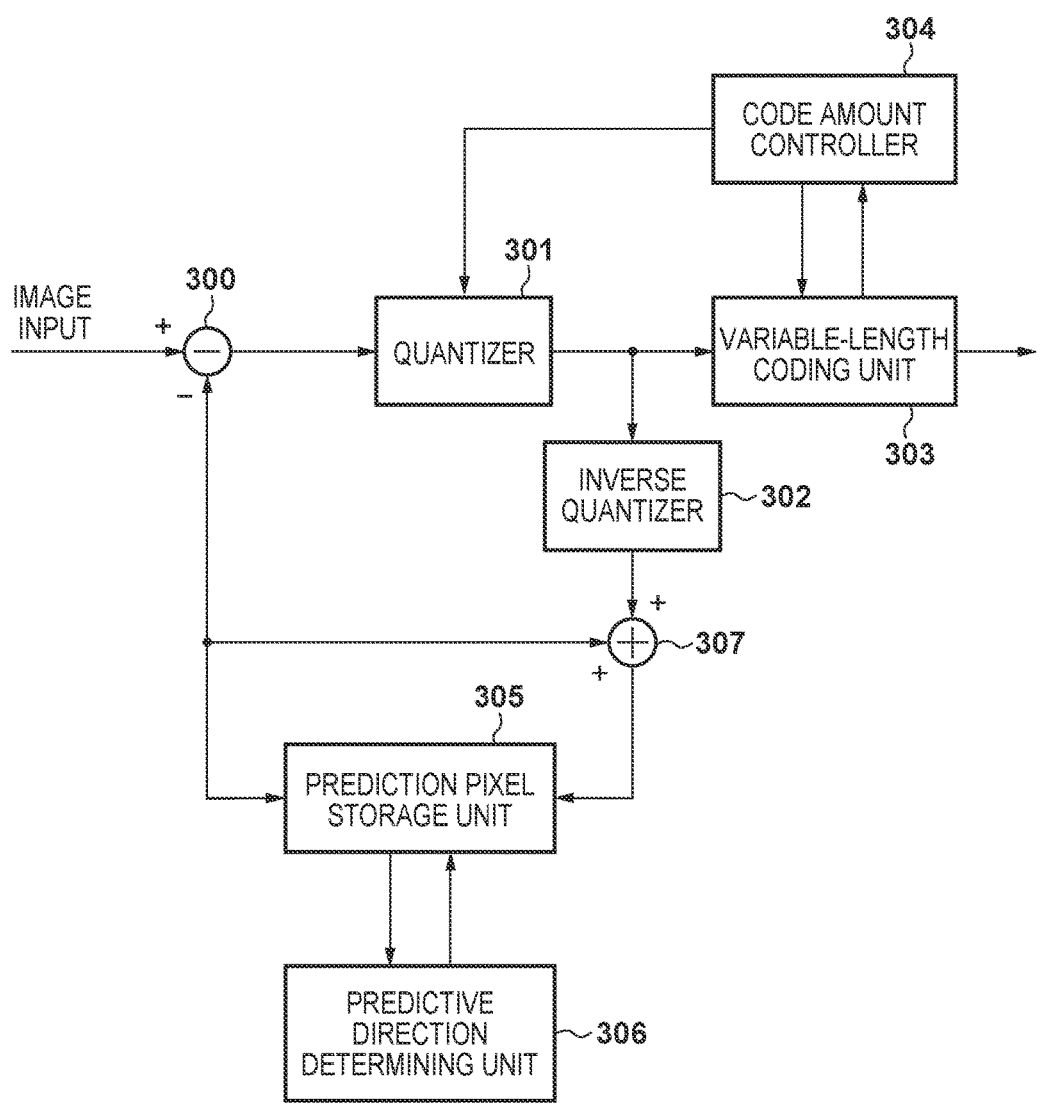
FIG. 3 is a configuration diagram of an encoding processor in the first embodiment.

FIG. 3 is a block configuration diagram of the encoding processors 103 and 104 in the embodiment. The encoding processors 103 and 104 receive new line pixel data that is read and generated by the read out controller 102, and perform predictive encoding thereof, specifically they encode a differential between a prediction value and actual pixel value. Firstly operation of the differential encoding is described.

A subtractor 300 take a differential between data of a pixel of interest that is the target of encoding and data of a prediction pixel stored in a prediction pixel storage unit 305, and supplies the differential value to a quantizer 301. The quantizer 301 performs quantization in accordance with a quantization step set by a code amount controller 304 in relation to the differential value that was sent. Then, the quantizer 301 supplies an inverse quantizer 302 and a variable-length coding unit 303 with the differential value after the quantization. The variable-length coding unit 303 inputs the differential value after quantization, performs variable-length coding, and then supplies the stream generator 105 with generated encoded data. Also, every time the variable-length coding unit 303 performs the encoding processing, it supplies the code amount controller 304 with information indicating the code length of the generated encoded data.

The code amount controller 304 performs code amount control so as to achieve a fixed length code amount in units of a particular decided number of pixels. For example, assume that the compression rate for 16 pixel units is set to 1/2. Assuming that one pixel in the pixel portion 101 is eight bits, since the data amount of 16 pixels prior to encoding is 128 bits, if the compression rate is 1/2, the code amount controller 304 performs code amount control so that the data amount after encoding becomes 64 bits. It is estimated that when a particular 16 pixel encoding is actually completed, the next 16 pixels will result in the same code amount. The code amount controller 304 controls the quantizer 301 so as to update the next 16 pixel quantization step every time 16 pixel encoding completes. Accordingly, the code amount control is performed delaying by the time corresponding to 16 pixels.

Note that it is assumed that the quantization step is updated in 16 pixel units, but there is no particular limitation on the number of pixels for the timing of the updating. If roughness is tolerated in the code amount control, the update timing may be in units of lines or in units of planes.

Also, configuration may be taken in which the variable-length coding unit 303 encodes in units of bit planes configured by bits of the same bit position of differential values after quantization. For example, as above, assume that the target code amount of the differential values of 16 pixels is 64 bits. The code amount in a plane of bit x is defined as A(x), and the total amount "A(0)+A(1)+ . . . +A(x)" of the encoded data of the plane from bit 0 to bit x is expressed as T(x). Also, the maximum bit position that defines the range that the differential values can take is made to be MSB. In such a case, the variable-length coding unit 303 obtains a minimum value b that satisfies the following formula.

$$T(MSB)-T(b) \leq 64$$

In a case where the minimum value b is obtained, the code amount controller 304 deletes encoded data in the plane of bit 0 through b among all encoded data that the variable-length coding unit 303 generates. The result of this is that execution of code amount control for 16 pixels as described above without the foregoing delay dependent upon number of pixels is possible.

The inverse quantizer 302 performs inverse quantization on the quantized differential values. Then, an adder 307 adds the differential value after the inverse quantization by the inverse quantizer 302 with the prediction value of the pixel of interest stored in the prediction pixel storage unit 305, and saves the pixel after the addition in the prediction pixel storage unit 305.

The prediction pixel storage unit 305 has, for example, one encoded frame's worth of capacity, and stores and holds the pixel data generated by the adder 307. Then, the prediction pixel storage unit 305 outputs the corresponding prediction pixel in accordance with a predictive direction that a predictive direction determining unit 306 decides. The predictive direction determining unit 306 decides the predictive direction and outputs the predictive direction to the prediction pixel storage unit 305.

Here, explanation of the encoding processors 103 and 104 is supplemented. Mixed pixel data of R and B components is inputted into the encoding processor 103 as illustrated in line 24 of FIG. 2. More specifically, when the leftmost head pixel is defined for convenience to be 0-th, R component pixels are even-numbered and B component pixels are odd-numbered. Thus, if the pixel to be encoded is positioned at an even-number of line 24, data of the prediction pixel that the predictive direction determining unit 306 decides in the encoding processor 103 is decided with reference to data of an even-numbered pixel with respect to the horizontal direction that the predictive pixel holding unit 305 holds. This is because an encoding pixel of interest color component and the prediction pixel color component are caused to match to increase coding efficiency. Meanwhile, if the pixel to be encoded is positioned at an odd-number of line 24, data of the prediction pixel that the predictive direction determining unit 306 decides in the encoding processor 103 is decided with reference to data of an odd-numbered pixel with respect to the horizontal direction that the predictive pixel holding unit 305 holds. That is, the predictive direction determining unit 306 in the encoding processor 103 switches the processing for obtaining the prediction pixel every one pixel.

In contrast to the above, data of pixels of only the G component is inputted into the encoding processor 104 in the embodiment, as illustrated in line 25 of FIG. 2. Therefore, since the encoded pixels are pixels of a monochrome image, the predictive direction determining unit 306 in the encoding processor 104 decides the prediction pixel in accordance with a single algorithm without performing switching of processing for obtaining the prediction pixel in accordance with whether the pixel of interest is odd-numbered or even-numbered.

Note that it is possible to configure by stacking the pixel portion 101 as a pixel layer and the encoding processors 103 and 104 as a signal processing layer as the configuration of the image sensor 100 in the present embodiment. For image capturing device (the image sensor 100) acceleration and simplification, the stream generator 105 may also be arranged externally to the image capturing device.

Also, as in the embodiment, it is possible to increase coding efficiency by supplying pixels of only the G component so that the level of spatial correlation of pixels becomes greater in the encoding processor 104.

By virtue of the present embodiment, as described above, it is possible to improve coding efficiency of image data obtained from pixels of a Bayer array. In imaging apparatuses as typified by digital cameras or video cameras up until now, the image sensor 100 and the circuits according to various image processing are connected via a system bus. Since resolutions of the image sensor 100 will continue to increase in the future, the data amounts transmitted between the image sensor 100 and the image processing circuit will continue to increase, and pressure on the bandwidth of the system bus is predicted. On this point, it is possible to expect that pressure on the bandwidth of the system bus will be mitigated by being able to suppress increases in the data amount outputted from the image sensor 100 by implementing a configuration for encoding in the image sensor 100 as in the present embodiment.

In the above described embodiment, since the encoding processors 103 and 104 have quantizers and code amount controllers, lossy encoding is performed. However, a target compression rate need not be set at a high precision, and configuration may also be taken so as to perform lossless encoding in which somewhat more compression than in the original RAW image data can be expected. The encoding processor 103 outputs two pixels at the head of the line of interest as are, and in the case where the pixel of interest that is the target of encoding is the third pixel or greater, Huffman encoding is performed on the differential with the pixel two previous (the pixel of the same color component) and lossless encoded data is outputted. Meanwhile, the encoding processor 104 outputs the one head pixel of the line of interest as is, and performs Huffman encoding on the differential with the immediately preceding pixel when encoding pixels of interest from there on and outputs as lossless encoded data.

Second Embodiment

In the second embodiment, an example is described in which the device configuration is the same as in the first embodiment, but the method of reading out from the pixel portion 101 by the read out controller 102 and outputting differs from the first embodiment.

The method of reading pixel data from the pixel portion 101 by the read out controller 102, and selectively outputting it in the second embodiment is described with reference to FIG. 4.

Figure 4:
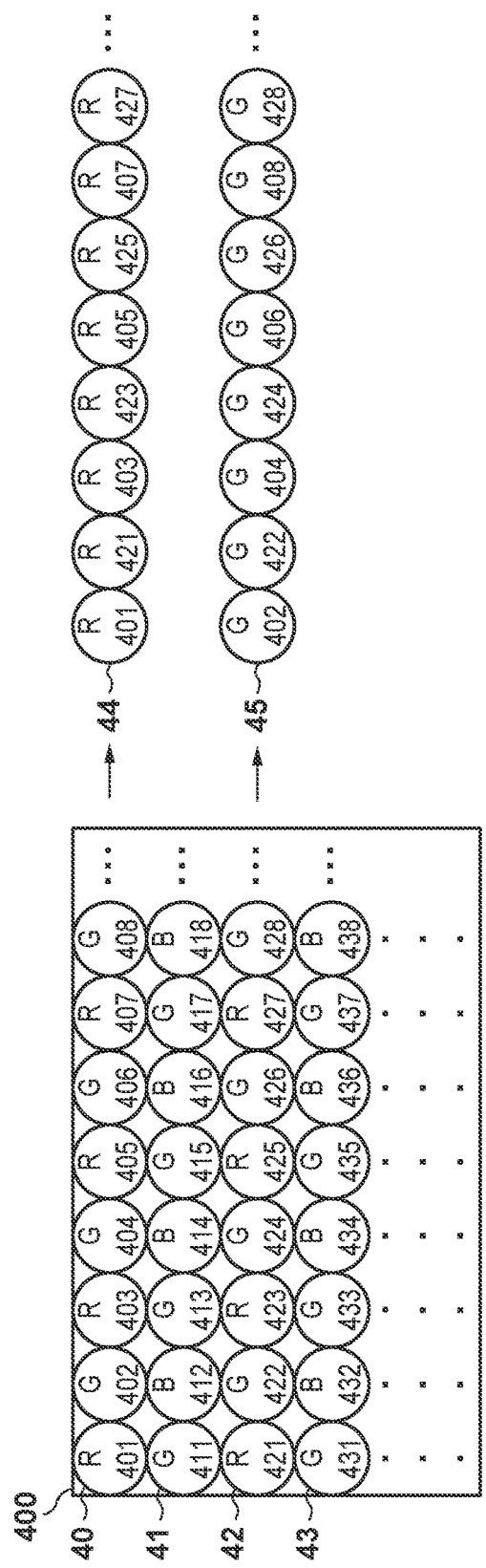
FIG. 4 is an explanatory view of control for reading from a pixel portion in a second embodiment.

The reference numeral 400 in FIG. 4 illustrates a two dimensional pixel arrangement in the pixel portion 101. The reference numerals 40 through 43 indicate respective lines. Pixels 401, 402, . . . , 408 . . . are a pixel group configuring the line 40. Pixels 411, 412, . . . , 418 . . . are a pixel group configuring the line 41. Pixels 421, 422, . . . , 428 . . . are a pixel group configuring the line 42. Pixels 431, 432, . . . , 438 . . . are a pixel group configuring the line 43.

Here, line 40 and the line 42 are both configured by R and G component pixels. Also, line 41 and the line 43 are both configured by G and B component pixels. That is, one line of a Bayer array is configured by pixels of two types of color components, and the color components included in the j-th line and the j+2-th line are the same as each other.

Thus, the read out controller 102 in the second embodiment is characterized in that, when it reads out two lines of pixel data from the pixel portion 101, it reads the j-th line and the j+2-th line of pixel data, generates two new lines of pixel data each of which is of a single color component, and supplies them to the encoding processors 103 and 104. An example is described below.

The pixel groups of L(j) which is the j-th line and L(j+2) which is the j+2-th line, that are read out from the pixel portion 101, can be defined as follows.

$$L(j)=\{P(0,j),P(1,j),P(2,j),\ldots\}$$

$$L(j+2)=\{P(0,j+2),P(1,j+2),P(2,j+2),\ldots\}$$

The read out controller 102 in the second embodiment generates pixel data of two new lines NL(j) and NL(j+1) in accordance with the following formulas (1).

$$NL(j)=\{P(0,j),P(0,j+2),P(2,j),P(2,j+2),\ldots\}$$

$$NL(j+1)=\{P(1,j),P(1,j+2),P(3,j),P(3,j+2),\ldots\} \quad (1)$$

Line 44 and line 45 in FIG. 4 correspond to the foregoing NL(j) and NL(j+1). As shown graphically, line 44 is configured only by data of pixels of the R component, and line 45 is configured only by data of pixels of the G component. That is, each of the new lines is of a single color component, and is in a state in which data of pixels whose pixel intervals are small is arranged, and so it becomes possible to increase spatial correlation.

Also, the read out controller 102 in the second embodiment generates pixel data of two new lines NL(j+2) and NL(j+3) in accordance with the following formulas (2) from data of the pixel groups of L(j+1) which is the j+1-th line and L(j+3) which is the j+3-th line.

$$NL(j+2)=\{P(1,j+1),P(1,j+3),P(3,j+1),P(3,j+3),\ldots\}$$

$$NL(j+3)=\{P(0,j+1),P(0,j+3),P(2,j+1),P(2,j+3),\ldots\} \quad (2)$$

Here, NL(j+2) is configured by only data of pixels of the B component, and NL(j+3) is configured by only data of pixels of the G component. Also, each time a readout of four lines from the pixel portion 101 completes, the read out controller 102 increases the variable j by four, and repeats the above process.

Figure 7:
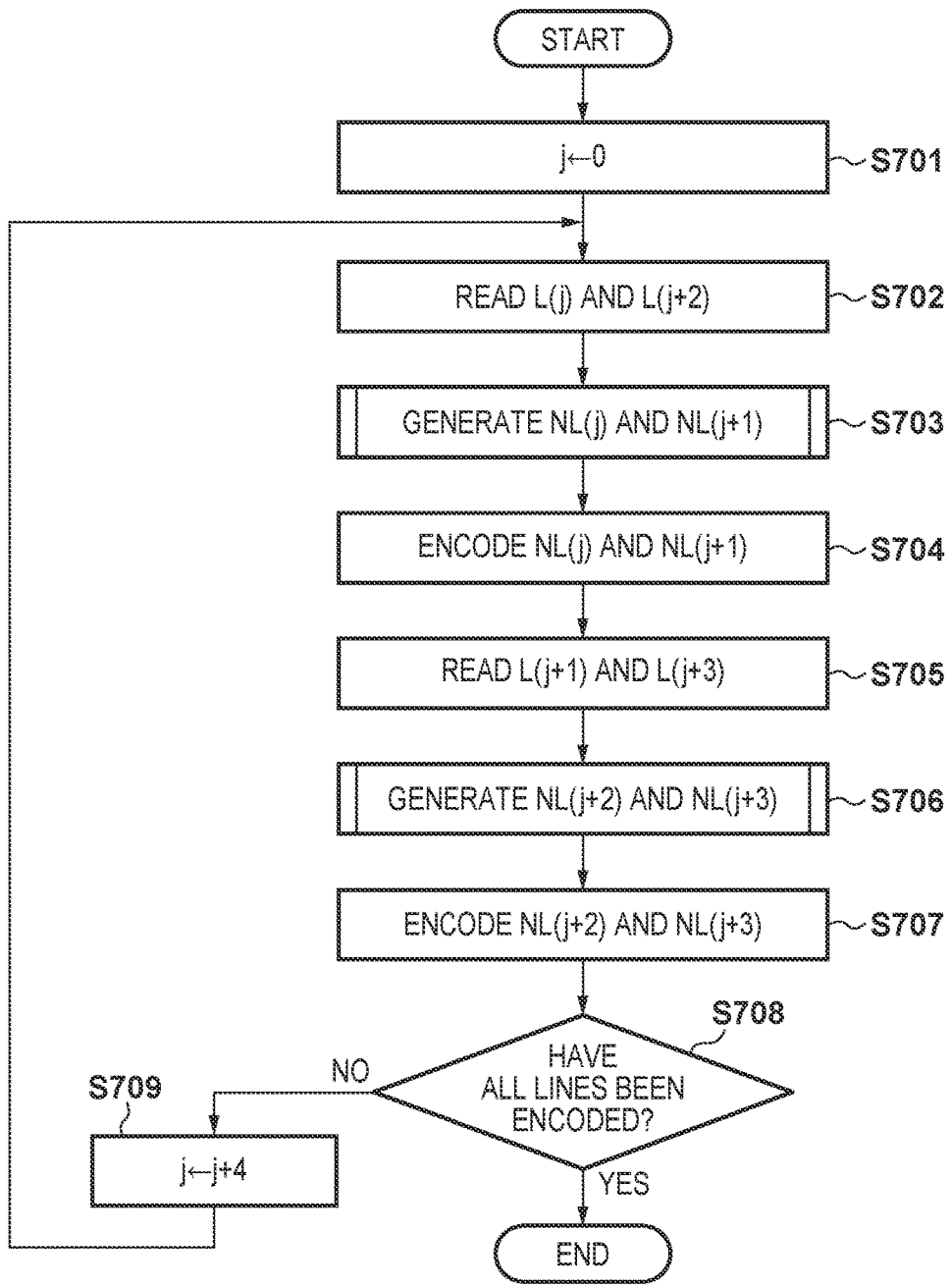
FIG. 7 is a flowchart for describing a processing procedure of a read out controller in the second embodiment.

The processing procedure of the read out controller 102 in the second embodiment is described in accordance with a flowchart in FIG. 7.

The read out controller 102, in step S701, initializes the variable j to zero. Then, the read out controller 102, from the pixel portion 101, reads out the data of the pixels of the j-th line L(j) and the j+2-th line L(j+2) in step S702.

Next, in step S703, the read out controller 102, based on the pixel data of the read out lines L(j) and L(j+2), generates, in accordance with the previously described formulas (1), the pixel data of the new lines NL(j) and NL(j+1) which are each of a single color component and are arranged in an order in which the intervals of the positions of the original pixels are small. Thus, the read out controller 102, in step S704, supplies the pixel data of the new line NL(j) to the encoding processor 103 and the pixel data of the new line NL(j+1) to the encoding processor 104, and causes encoding to be performed.

The read out controller 102, from the pixel portion 101, reads out the data of the pixels of the j+1-th line L(j+1) and the j+3-th line L(j+3) in step S705. Then, in step S706, the read out controller 102, based on the pixel data of L(j+1) and L(j+3) lines that are read out, generates the pixel data of the new lines NL(j+2) and NL(j+3) in accordance with the formulas (2) described previously. The pixel data of each new line is of a single color component, and is configured by pixels arranged in an order in which the intervals of positions of the original pixels are small. Then, the read out controller 102, in step S707, supplies the pixel data of the new line NL(j+2) to the encoding processor 103 and the pixel data of the new line NL(j+3) to the encoding processor 104, and causes encoding to be performed.

The read out controller 102, in step S708, determines whether or not the encoding processing has completed for data of all lines of the pixel portion 101. If not, the processing proceeds to step S709, and the read out controller 102 causes the variable j to increase by four and returns the processing to step S702. On the other hand, in step S708, if the read out controller 102 determines that the encoding processing of the data of all lines in the pixel portion 101 is completed, this processing terminates.

Note that above it was described that there is sufficient memory (enough for four lines—the two lines that are read out and the two new lines) in the read out controller 102. However, configuration may also be taken to read out of data of two pixels arranged in a vertical direction from the pixel portion 101 in the read out controller 102, appropriately switch in accordance with the rule described previously, and output to the encoding processors 103 and 104 respectively. In such a case it is sufficient that there is a buffer for the two pixels' worth that is read out, and it is possible to reduce the circuit scale in the read out controller 102.

Next, operation of the encoding processors 103 and 104 in the second embodiment is described. The internal configuration is the same as in the first embodiment and so it is omitted.

As is clear from the foregoing description, pixel data of a line configured only by pixels of the R component and pixel data of a line configured only by pixels of the B component are supplied alternatingly to the encoding processor 103. Meanwhile, only data of pixels of the G component is supplied to the encoding processor 104. Therefore, the encoding processor 104 may perform similar processing to that of the first embodiment.

Also, if the encoding processor 103 decides the prediction pixel in relation to the pixel to be encoded by referencing only data of a line that the pixel of interest belongs to, there is no particular problem.

However, if it decides the prediction pixel in relation to the pixel of interest to be encoded by referencing a line other than that of the pixel of interest, that is data of a pixel that is already encoded and is arranged in the two dimensional space, the encoding processing requires processing that is different to the first embodiment. Hereinafter, a supplemental explanation will be given for a case in which the encoding processor 103 references data of a pixel that is already encoded and that is arranged in a two dimensional space for the prediction pixel of the pixel of interest to be encoded.

The first line of the encoding is made to be line 0 for convenience. The read out controller 102, in step S704 and step S707, supplies the new lines NL to the encoding processor 103. Thus, from the perspective of the encoding processor 103, in step S704, what is supplied from the read out controller 102 is the pixel data of an even-numbered line, and in step S707 what is supplied from the read out controller 102 is the pixel data of an odd-numbered line. As is clear from the description thus far, from the perspective of the encoding processor 103, even-numbered lines are configured only by data of pixels of the R component, and odd-numbered lines are configured only by data of pixels of the B component.

Thus, the predictive direction determining unit 306 in the encoding processor 103 decides the prediction pixel by referencing only even-numbered line pixel data stored in the prediction pixel storage unit 305 if the pixel of interest to be encoded belongs to an even-numbered line. Also, the predictive direction determining unit 306 in the encoding processor 103 decides the prediction pixel by referencing only odd-numbered line pixel data stored in the prediction pixel storage unit 305 if the pixel of interest to be encoded belongs to an odd-numbered line.

Note that it is possible to configure by stacking the pixel portion 101 as a pixel layer and the encoding processors 103 and 104 as a signal processing layer as the configuration in the second embodiment. Also, as in the second embodiment, it is possible to increase coding efficiency by reading pixels of data so that the level of spatial correlation of pixels becomes greater in the encoding processor.

Third Embodiment

Figure 5:
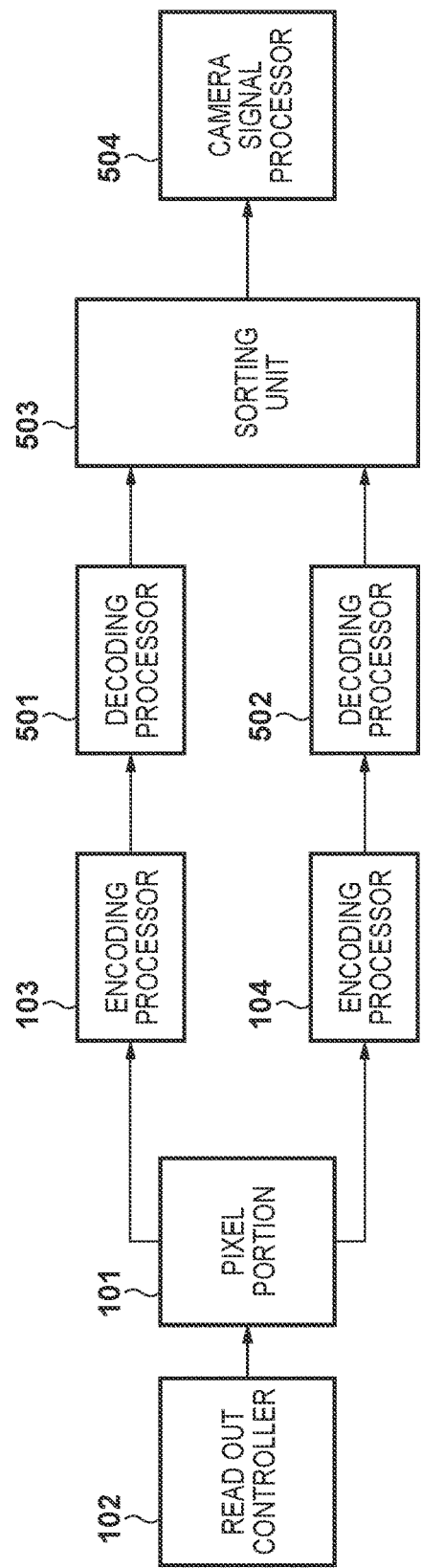
FIG. 5 is a block configuration diagram of an imaging apparatus in a third embodiment.

In the third embodiment, an imaging apparatus is described as a system in which the configurations of the first and second embodiments described above are included. Note that in the third embodiment, because encoding and decoding is performed in one system, configuration is not such that the stream generator 105 in FIG. 1 is included. Of course, the stream generator 105 may be also be included. In FIG. 5, the pixel portion 101, the read out controller 102, and the encoding processors 103 and 104 are similar to the configurations in the first and second embodiments.

Decoding processors 501 and 502 as shown graphically input encoded data in units of lines that are encoded in the encoding processors 103 and 104, and perform decoding thereon. A sorting unit 503, based on two lines of pixels obtained by decoding, performs processing to sort in a fashion that is inverse to that of the read out controller 102, and generates pixel data of the original Bayer array (RAW image data). A camera signal processor 504 performs image capturing system signal processing such as demosaic processing, aperture correction, gamma correction, white balancing or the like on the pixels sorted by the sorting unit 503.

In the configuration of the imaging apparatus in the third embodiment, the pixel portion 101 and the encoding processors 103 and 104 can be configured within the image sensor 100, and the decoding processors 501 and 502, the sorting unit 503, and the camera signal processor 504 can be configured within the signal processing IC. It is possible to construct an imaging system, raising the coding efficiency by reading out pixels so that the level of spatial correlation of pixels increases with respect to the encoding processor as in the third embodiment.

Fourth Embodiment

Figure 8:
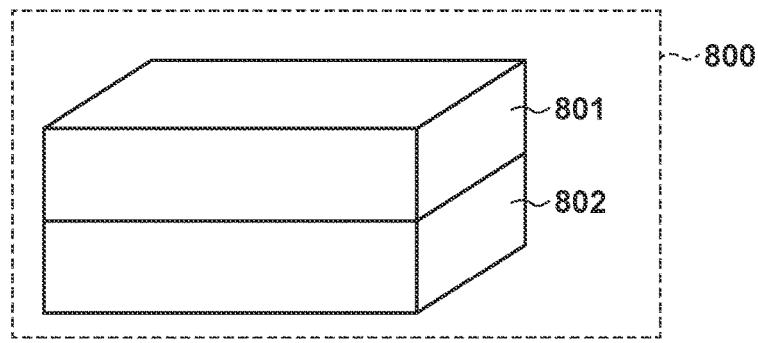
FIG. 8 is a view illustrating an example of a configuration of a stack chip in a fourth embodiment.

Next, a fourth embodiment is described. In the fourth embodiment, an example in which the pixel portion is of a stacked structure is described. As illustrated in FIG. 8, in an imaging unit 800, an imaging chip 801 on which the pixel portion 101 is formed, and a high speed logic process chip 802 on which the read out controller 102 and the encoding processors 103 and 104 are formed are stacked at the chip level.

Fifth Embodiment

Figure 9:
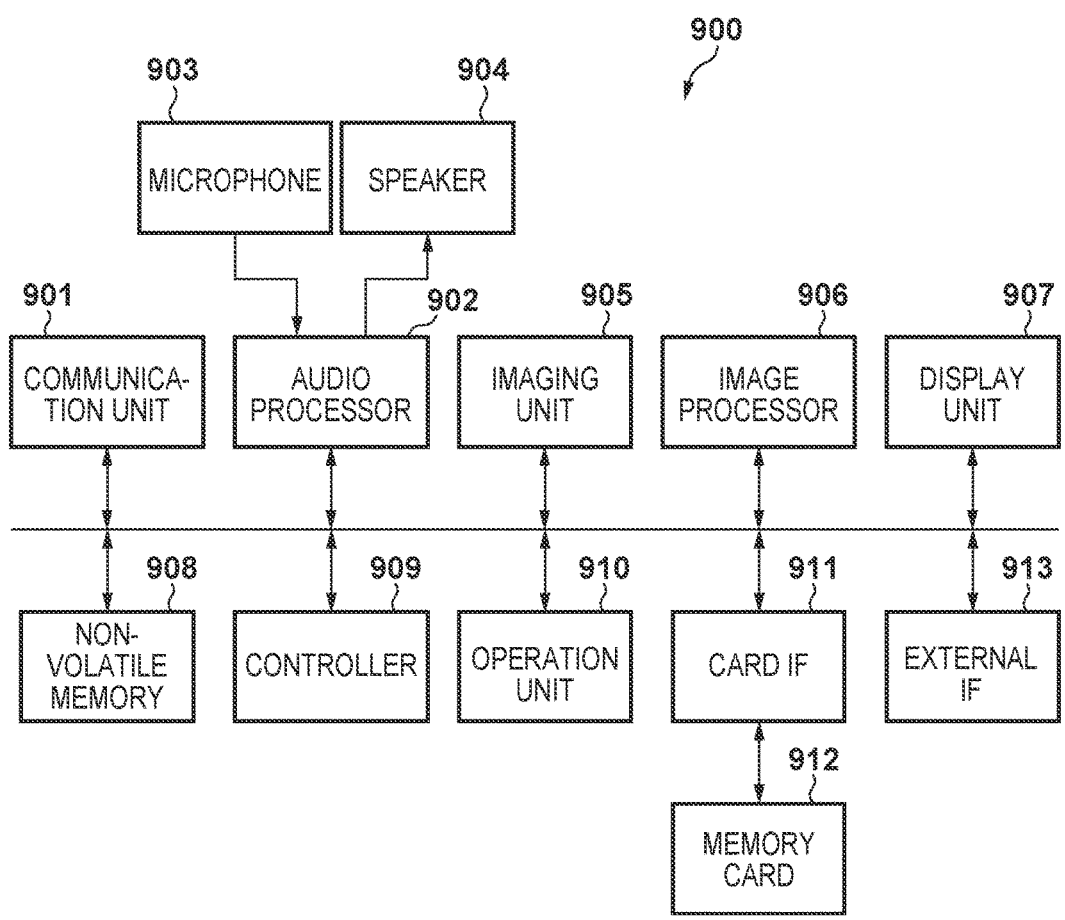
FIG. 9 is a block configuration diagram of a mobile telephone that a fifth embodiment applies.

FIG. 9 is a block diagram illustrating a configuration of a mobile telephone (encompasses smartphones) 900 that the fifth embodiment applies. The mobile telephone 900 has an audio call function, and also an electronic mail function, an Internet connection function, image capture, reproduction functions, and the like.

In the view, a communication unit 901 communicates audio data, image data, or the like with another telephone by a communication method according to a communication carrier with which a user made a contract. An audio processor 902, at a time of an audio call, converts audio data from a microphone 903 into a format suitable for transmission, and sends the result to the communication unit 901. Also, the audio processor 902 decodes audio data from a call partner sent from the communication unit 901, and sends the result to a speaker 904. An imaging unit 905 corresponds to the image sensor 100 described in the first and second embodiments or the imaging apparatus described in the third embodiment, and the imaging unit 905 captures images of a subject and outputs image data. An image processor 906 processes image data captured by the imaging unit 905 at a time of capturing an image, converts it into a format suitable for recording, and outputs the result. Also, the image processor 906, at a time of reproducing a recorded image, processes the reproduced image, and sends the result to a display unit 907. The display unit 907 has a liquid crystal display panel of approximately several inches, and displays various screens in accordance with instructions from a controller 909. A non-volatile memory 908 stores address book information, electronic mail data, and data such as image data captured by the imaging unit 905.

The controller 909 has a CPU, a memory, and the like, and controls each unit of the telephone 900 in accordance with control programs stored in a memory (not shown). An operation unit 910 has a power button, number keys, and also various operation keys for a user to input data. A card IF 911 performs a recording reproduction of various data in relation to a memory card 912. An external IF 913 transmits data stored on the non-volatile memory 908 or the memory card 912 to an external apparatus, or receives data transmitted from an external apparatus. The external IF 913 performs communication by a publicly known communication method such as a wired communication method such as USB, wireless communication, or the like.

Next, an audio call function in the telephone 900 is described. If a call is made to a call partner, the number of the call partner is input by the user operating the number keys of the operation unit 910 or an address book stored in the non-volatile memory 908 is displayed on the display unit 907 and the call partner is selected therefrom, and then an instruction to make the call is made. When the instruction for the call is made, the controller 909 makes the call to the call partner by the communication unit 901. When a call is made to a call partner, the communication unit 901 outputs audio data of the partner to the audio processor 902 and also transmits audio data of the user to the partner.

Also, in the case in which an electronic mail is transmitted, the user makes an instruction for the generation of an email using the operation unit 910. When the instruction for the generation of the email is made, the controller 909 displays a screen for generating an email on the display unit 907. The user inputs a transmission destination address and text using the operation unit 910, and makes an instruction for transmission. When a mail transmission is instructed, the controller 909 sends address information and data of the mail body to the communication unit 901. The communication unit 901 converts the email data into a format suitable for communication, and sends it to the transmission destination. Also, the communication unit 901, when an electronic mail is received, converts the data of the received email into a format suitable for display, and displays the result on the display unit 907.

Next, a capturing function in the telephone 900 is described. After the user sets the image capturing mode by operating the operation unit 910, and instructs the capturing of a still image or a moving image, the imaging unit 905 captures still image data or video data, and sends it to the image processor 906. Encoding processing is performed on the still image data or video data that the image processor 906 captures, and the result is stored in the non-volatile memory 908. Also, the image processor 906 sends the captured still image data or video data to the card IF 911. The card IF 911 stores the still image or video data in the memory card 912.

Also, the telephone 900 can transmit a file including a still image or video data captured in this way as an attachment file of the electronic mail. Specifically, when transmitting the electronic mail, the image file stored in the non-volatile memory 908 or the memory card 912 is selected, and transmission as an attachment file is instructed.

Also, the telephone 900 can transmit a file including a captured still image or video data to an external apparatus such as a PC, another telephone or the like by the external IF 913. The user operates the operation unit 910 to select an image file stored in the non-volatile memory 908 or the memory card 912 and then makes an instruction for transmission. The controller 909 reads out the selected image file from the non-volatile memory 908 or the memory card 912, and controls the external IF 913 to transmit it to the external apparatus.

Note that in the above, the imaging unit 905 was described as something that corresponds to the image sensor 100 in the first and second embodiments or the imaging apparatus described in the third embodiment. However, as illustrated in the fourth embodiment, a part of the image processor 906 (for example, the read out controller or the encoding processors 103 and 104 of FIG. 1) may be configured as the imaging unit 905 by chip stacking. Also, the present invention is not limited to an imaging unit of a mobile telephone as in the present embodiment, and for example, it is possible to apply it to an imaging unit of an in-vehicle camera, a medical device, various industrial instruments or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-022216, filed Feb. 8, 2016, which is hereby incorporated by reference herein in its entirety.

What is claimed is:

1. An image encoding apparatus, comprising:
at least one circuit or processor that operates as:
  a generator which generates two new lines of pixel data, by sorting, in accordance with a rule set in advance, two lines of pixel data which are obtained from a pixel portion in which a plurality of pixels that output signals of each color component are arranged in a Bayer array;
  a first encoder which encodes pixel data of one of the two new lines generated by the generator; and
  a second encoder which encodes pixel data of the other of the two new lines generated by the generator;
wherein the generator, based on two lines of pixel data adjacent in the pixel portion, generates, as the two new lines of pixel data, pixel data of a first line in which R and B components are arranged alternatingly and pixel data of a second line configured by pixels of only a G component,
the first encoder inputs the first line of pixel data, and in relation to a pixel of interest to be encoded in the first line, generates a prediction pixel with reference to an already encoded pixel of the same color component as the pixel of interest, and performs predictive encoding, and
the second encoder inputs the second line of pixel data, and in relation to a pixel of interest to be encoded in the second line, generates a prediction pixel that relates to the pixel of interest with reference to an already encoded pixel, and performs predictive encoding.

2. An image encoding apparatus, comprising:
at least one circuit or processor that operates as:
  a generator which generate two new lines of pixel data, by sorting, in accordance with a rule set in advance, two lines of pixel data which are obtained from a pixel portion in which a plurality of pixels that output signals of each color component are arranged in a Bayer array;
  a first encoder which encodes pixel data of one of the two new lines generated by the generator; and
  a second encoder which encodes pixel data of the other of the two new lines generated by the generator;
wherein the generator, based on two lines of pixel data that sandwich one line between them in the pixel portion, generates pixel data of a first line and a second line respectively configured by pixels of a single color component, and supplies pixel data of the first line to the first encoder and pixel data of the second line to the second encoder,
wherein the first and second encoders respectively, in relation to a pixel of interest to be encoded in the supplied line, generate a prediction pixel in relation to the pixel of interest with reference to pixel data of already encoded pixels, and perform predictive encoding.

3. An imaging apparatus, comprising:
a Bayer array pixel portion;
at least one circuit or processor that operates as:
  a generator which generates two new lines of pixel data by sorting, in accordance with a rule set in advance, two lines of pixel data obtained from the pixel portion;
  a first encoder which encodes pixel data of one of the two new lines generated by the generator; and
  a second encoder which encodes pixel data of the other of the two new lines generated by the generator;
wherein the generator, based on two lines of pixel data adjacent in the pixel portion, generates, as the two new lines of pixel data, pixel data of a first line in which R and B components are arranged alternatingly and pixel data of a second line configured by pixels of only a G component,
the first encoder inputs the first line of pixel data, and in relation to a pixel of interest to be encoded in the first line, generates a prediction pixel with reference to an already encoded pixel of the same color component as the pixel of interest, and performs predictive encoding, and
the second encoder inputs the second line of pixel data, and in relation to a pixel of interest to be encoded in the second line, generates a prediction pixel that relates to the pixel of interest with reference to an already encoded pixel, and performs predictive encoding.

4. The apparatus according to claim 3, wherein the least one circuit or processor further operates as:
  a first decoder which decodes encoded data generated by the first encoder;
  a second decoder which decodes encoded data generated by the second encoder; and
  a sorter which generates Bayer array image data from two lines of pixel data obtained from the first and second decoders.

5. The apparatus according to claim 3, wherein in one chip the pixel portion is stacked as a first layer, and the generator and the first and second encoders are stacked as a second layer.

6. An image encoding method for encoding image data obtained by a pixel portion in which a plurality of pixels that output signals of each of color components are arranged in a Bayer array, the method comprising:
  generating two new lines, of a first line and a second line, of pixel data by sorting, in accordance with a rule set in advance, two lines of pixel data obtained from the pixel portion;
  encoding pixel data of the first line; and
  encoding pixel data of the second line, wherein
  in the generating, based on two lines of pixel data adjacent in the pixel portion, pixel data of the first line in which R and B components are arranged alternatingly and pixel data of the second line configured by pixels of only a G component are generated,
  in the encoding of the first line, the first line of pixel data, is inputted, in relation to a pixel of interest to be encoded in the first line, a prediction pixel with reference to an already encoded pixel of the same color component as the pixel of interest is generated, and predictive encoding is performed, and
  in the encoding of the second line, the second line of pixel data is inputted, in relation to a pixel of interest to be encoded in the second line, a prediction pixel that relates to the pixel of interest with reference to an already encoded pixel is generated, and predictive encoding is performed.

7. A non-transitory computer-readable storage medium storing a computer program which causes a computer to execute steps in a method of controlling an image encoding apparatus, the method comprising;

generating two new lines, of a first line and a second line, of pixel data by sorting, in accordance with a rule set in advance, two lines of pixel data obtained from a pixel portion;

encoding pixel data of the first line; and encoding pixel data of the second line, wherein in the generating, based on two lines of pixel data adjacent in the pixel portion, pixel data of the first line in which R and B components are arranged alternatingly and pixel data of the second line configured by pixels of only a G component are generated, in the encoding of the first line, the first line of pixel data, is inputted, in relation to a pixel of interest to be encoded in the first line, a prediction pixel with reference to an already encoded pixel of the same color component as the pixel of interest is generated, and predictive encoding is performed, and in the encoding of the second line, the second line of pixel data is inputted, in relation to a pixel of interest to be encoded in the second line, a prediction pixel that relates to the pixel of interest with reference to an already encoded pixel is generated, and predictive encoding is performed.

8. An image encoding method for encoding image data obtained by a pixel portion in which a plurality of pixels that output signals of each of color components are arranged in a Bayer array, the method comprising:

generating two new lines, of a first line and a second line, of pixel data by sorting, in accordance with a rule set in advance, two lines of pixel data obtained from the pixel portion;

encoding pixel data of the first line; and encoding pixel data of the second line, wherein in the generating, based on two lines of pixel data that sandwich one line between them in the pixel portion, pixel data of the first line and the second line respectively configured by pixels of a single color component are generated, and in the encoding of the first and second lines respectively, in relation to a pixel of interest to be encoded in one which is the first or second line, a prediction pixel in relation to the pixel of interest with reference to pixel data of already encoded pixels is generated, and predictive encoding is performed.

9. A non-transitory computer-readable storage medium storing a computer program which causes a computer to execute steps in a method of controlling an image encoding apparatus, the method comprising;

generating two new lines, of a first line and a second line, of pixel data by sorting, in accordance with a rule set in advance, two lines of pixel data obtained from a pixel portion;

encoding pixel data of the first line; and encoding pixel data of the second line, wherein in the generating, based on two lines of pixel data that sandwich one line between them in the pixel portion, pixel data of the first line and the second line respectively configured by pixels of a single color component are generated, and in the encoding of the first and second lines respectively, in relation to a pixel of interest to be encoded in one which is the first or second line, a prediction pixel in relation to the pixel of interest with reference to pixel data of already encoded pixels is generated, and predictive encoding is performed.

\* \* \* \* \*